US006892351B2

(12) United States Patent
Vasudevan et al.

(10) Patent No.: US 6,892,351 B2
(45) Date of Patent: May 10, 2005

(54) CREATING A MULTIMEDIA PRESENTATION FROM FULL MOTION VIDEO USING SIGNIFICANCE MEASURES

(75) Inventors: Vinod V. Vasudevan, Foster City, CA (US); Gurminder Singh, Cupertino, CA (US); Manoranjan D. Jesudoss, Singapore (SG)

(73) Assignee: Newstakes, Inc., Burlingame, CA (US)

( * ) Notice: Subject to any disclaimer, the term of this patent is extended or adjusted under 35 U.S.C. 154(b) by 469 days.

(21) Appl. No.: 10/051,631

(22) Filed: Jan. 17, 2002

(65) Prior Publication Data

US 2002/0140721 A1 Oct. 3, 2002

Related U.S. Application Data

(63) Continuation-in-part of application No. 09/215,004, filed on Dec. 17, 1998, now Pat. No. 6,342,904.

(51) Int. Cl.[7] .................................................. G09G 5/00
(52) U.S. Cl. ..................... 715/716; 715/723; 715/500.1
(58) Field of Search ................................ 715/716, 723, 715/730–732, 500.1; 358/448, 467; 345/716, 723, 730–732

(56) References Cited

U.S. PATENT DOCUMENTS

| 5,179,449 A | | 1/1993 | Doi ............................. 358/311 |
| 5,253,069 A | | 10/1993 | Zeyer ........................... 358/209 |
| 5,459,517 A | | 10/1995 | Kunitake et al. ............ 348/416 |
| 5,489,949 A | | 2/1996 | Jeong et al. ................. 348/699 |
| 5,521,841 A | | 5/1996 | Arman et al. ............... 364/514 |
| 5,537,528 A | | 7/1996 | Takahashi et al. .......... 395/154 |
| 5,550,965 A | * | 8/1996 | Gabbe et al. ................ 715/512 |
| 5,606,655 A | | 2/1997 | Arman et al. ............... 395/140 |
| 5,635,982 A | | 6/1997 | Zhang et al. ................ 348/231 |
| 5,640,560 A | | 6/1997 | Smith .......................... 395/615 |
| 5,642,171 A | * | 6/1997 | Baumgartner et al. ...... 348/515 |
| 5,664,227 A | | 9/1997 | Mauldin et al. ............. 395/778 |
| 5,686,961 A | | 11/1997 | Gasztonyi et al. .......... 348/390 |
| 5,708,767 A | | 1/1998 | Yeo et al. .................... 395/140 |

(Continued)

OTHER PUBLICATIONS

Vinod V. V., et al. "Video Shot Analysis using Efficient Multiple Object Tracking." IEEE Computer Society Press (1997) USA.

Vinod V. V., et: al. "Focused Color Intersection With Efficient Searching For Object Extraction." Pattern Recognition, vol. 30, No. 10 (1997) pp. 1787–1797.

Vinod V. V., et. al. "Activity Based Video Shot Retrieval and Ranking." IEEE Computer Society Press (1998) USA pp. 682–684.

Bimbo et al. "Analysis of Optical Flow Constraints" IEEE Transactions on Image Processing, vol. 4, No. 4, (1995).

*Primary Examiner*—Sy D. Luu
(74) *Attorney, Agent, or Firm*—Ladas & Parry LLP (57) ABSTRACT

Methods apparatus and computer programs products for creating a multimedia presentation having video frames and video segments with synchronized audio are disclosed. Audio-video data is separated into an audio stream and the video sequence. The video sequence is divided into video segments, with each video segment comprising a group of frames. For each video segment an audio significance measure is calculated using the audio stream. Using the audio significance measure, the video segment is selected in its entirety or, alternatively, one or more slide frames are extracted from the corresponding group of frames. The selection of video segments or slide frames can also be performed on the basis of an additional video significance measure. The audio stream and selected video segment and slide frames are synchronized, then synchronously reproduced as the multimedia presentation.

23 Claims, 7 Drawing Sheets

U.S. PATENT DOCUMENTS

| | | | |
|---|---|---|---|
| 5,760,767 A | 6/1998 | Shore et al. | 345/328 |
| 5,793,429 A | 8/1998 | Kim et al. | 348/416 |
| 5,893,062 A | 4/1999 | Bhadkamkar et al. | 704/270 |
| 5,949,410 A * | 9/1999 | Fung | 715/500.1 |
| 5,999,173 A | 12/1999 | Ubillos | 345/328 |
| 6,122,668 A * | 9/2000 | Teng et al. | 709/231 |
| 6,141,001 A | 10/2000 | Baleh | 345/302 |
| 6,154,771 A | 11/2000 | Rangan et al. | 709/217 |
| 6,172,675 B1 | 1/2001 | Ahmad et al. | 345/328 |
| 6,369,835 B1 * | 4/2002 | Lin | 345/726 |
| 6,404,978 B1 * | 6/2002 | Abe | 386/55 |
| 6,504,990 B1 * | 1/2003 | Abecassis | 386/46 |
| 6,616,700 B1 * | 9/2003 | Thum et al. | 715/500.1 |
| 6,621,502 B1 * | 9/2003 | Nair et al. | 345/716 |
| 6,636,237 B1 * | 10/2003 | Murray et al. | 345/719 |
| 6,636,238 B1 * | 10/2003 | Amir et al. | 345/730 |
| 6,738,075 B1 * | 5/2004 | Torres et al. | 345/723 |
| 2004/0114904 A1 * | 6/2004 | Sun et al. | 386/46 |

* cited by examiner

CREATING A MULTIMEDIA PRESENTATION FROM FULL MOTION VIDEO USING SIGNIFICANCE MEASURES

RELATED APPLICATION

This is a continuation-in-part of application Ser. No. 09/215,004, filed Dec. 17, 1998 now U.S. Pat. No. 6,342,904 the contents of which are incorporated herein by cross-reference.

FIELD OF THE INVENTION

The present invention relates to audio-video processing, and particularly to systems for converting full motion video into a multimedia presentation comprising of video frames and video segments with synchronized sound through the use of content-based video reformatting, based on significance measures.

BACKGROUND OF THE INVENTION

Effective use of storage media and/or channel capacity has been the aim of many data processing systems. Management of video data is particularly important because video requires a medium or channel with high capacity, typically many megabytes of data per minute. One way to reduce the medium or channel capacity required is by converting a full motion video into a multimedia presentation showing salient visuals and/or video segments with corresponding audio rather than full motion video.

A video is also a pre-packaged presentation which has a fixed pace. This fixed pace is a limitation and is particularly problematic when videos are used in the educational context. This is because it assumes that the absorption rate of each member of the target audience is the same. A multimedia presentation comprising of slides and video segments, on the other hand, provides a higher level of interactivity in the sense that the user has the option to view any one slide or video segment for a longer or shorter time period, as required. A further advantage of such a multimedia presentation is that it can be easily augmented with supplementary information, thereby adding further value to the content.

Parent application Ser. No. 09/215,004 teaches and claims, inter alia, the conversion of full motion video into a slide show with synchronized audio. The video sequence of audio-video data is divided into segments, each comprising a group of frames. For each segment at least one representative keyframe is extracted. From the extracted frame(s) a significance measure is calculated. The significance measure can be determined from a level of relative movement between frames. The selected slide frames are synchronized with the audio stream to create a slide show.

There can be instances, however, where there is a low degree of relative movement between video frames, and yet the segment is important for reason of containing meaningful information or rich audio content.

SUMMARY OF THE INVENTION

Therefore, in accordance with a first aspect of the invention, there is disclosed a method for creating a multimedia presentation having video frames and video segments with synchronized audio based on an audio significance measure.

The method comprises the steps of:
(a) receiving audio-video data;
(b) separating said audio-video data into an audio stream and a video sequence;
(c) dividing said video sequence into video segments, each of said video segments comprising a group of frames;
(d) for each said video segment
  (d1) calculating an audio significance measure using said audio stream related to said video segment;
  (d2) using at least said audio significance measure, selecting either said video segment in its entirety or extracting at least one slide frame from said corresponding group of frames;
(e) synchronizing said audio stream and said selected video segment and slide frames; and
(f) synchronously reproducing selected video segments and slide frames and said audio stream as said multimedia presentation.

In accordance with a second aspect of the invention, there is disclosed a method for creating a multimedia presentation having video frames and video segments with synchronized audio using audio and video significance values.

The method comprises the steps of:
(a) receiving audio-video data;
(b) separating said audio-video data into an audio stream and a video sequence;
(c) dividing said video sequence into video segments, each of said video segments comprising a group of frames;
(d) for each said video segment
  (d1) extracting at least one representative frame from the corresponding said group of frames;
  (d2) calculating a video significance measure using said frames;
  (d3) calculating an audio significance measure using said audio stream related to said video segment;
  (d4) using said video and audio significance measures, selecting either said video segment in its entirely or extracting at least one slide frame from said group of frames;
(e) synchronizing said audio stream and said selected video segments and slide frames; and
(f) synchronously reproducing said segments and slide frames and said audio stream.

The invention further comprises apparatus for creating a multimedia presentation having video frames and video segments with synchronized audio comprising means for giving effect to the steps of the methods.

The invention yet further provides a computer program product including a computer readable medium incorporating a computer program for creating a multimedia presentation having video frames and video segments with synchronized audio, the computer program having program code means to give effect to the steps of the methods.

DETAILED DESCRIPTION AND BEST MODE

In the description, components of the system may be implemented as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules. Also, as described in parent application Ser. No. 09/215,004 (incorporated herein by cross-reference), the system may be implemented in a distributed manner using a network.

According to the invention, slide shows or still presentations are created displaying salient visuals accompanied by synchronized audio for the less significant segments of a video sequence, while video clips with synchronized audio are presented for the more significant video segments. A video segment is significant if the segment contains a lot of video and/or audio activity. For example, a video segment containing a newsreader reading the news is not as significant visually as video footage of a news item such as video panning across several buildings damaged by a violent storm. However, the audio content, being the news itself, is of significance for it's information content.

The number of stills presented for the less significant video segments is based on an actual value of a significance measure associated with this segment. The relevant significance measure includes audio activity measures, and/or those for video. Thus, the selected stills or slides are determined based on audio significance measures, video significance measures, or a combination of the two.

The invention intelligently determines if a video segment should be converted to a sequence of stills or presented as a video clip in the overall presentation or document. Importantly, this process is entirely or essentially automatic, rather than largely or entirely manual. However, the invention does enable a user to fine-tune the presentation by modifying or adjusting the selected slides or rate of slide presentation, for example. The decision of whether to use slides or a video clip, and if slides which ones, is made based on the significance measure associated with that video segment; the relevant significance measure is a video significance measure, an audio significance measure, or a combination of video and audio significance measures.

Preferably, the invention can be practiced with a combination of video and audio significance measures. However, in appropriate applications, an audio significance measure alone can be employed. For example, in a video recording of a sporting event such as a soccer game, a video recording device may be remotely located high above the playing field so that players on the playing field appear as small objects. In this circumstance, the video activity of the shot is relatively low. However, if a player scores a goal, the audience may erupt with a significant cheer or applause. Thus, while the video activity is low, the audio activity may be very significant. If so, this shot may be retained as a video clip (or otherwise frames as selected from this shot) based largely or entirely on the audio significance measure, for example. The same applies to video significance measures.

If the segment is to be converted to a sequence of stills, the desired slides are selected from keyframes, Rframes, or the video itself in a content-based fashion. The slides are selected from a video segment based on audio significance measures, video significance measures, or a combination of video and audio components of the video segments. The invention may operate with user-supplied significance measures, and/or compute its own measures. This allows a user to decide the presentation rate of slides and the number of video clips in an analog fashion (e.g., less or more, using a slider control) and provides audio synchronization with the selected slides.

The system reduces the temporal resolution of visuals of audio-video (AV) data. This is advantageous in that it permits AV content to be transmitted over variable bandwidth networks, for example, based on audio activity, video activity, or a combination of audio and video activity in the media segments.

The invention is still more advantageous in converting full motion video into a slideshow based on audio activity, since in some circumstances video activity alone is not sufficient. The significance of an event may be conveyed by audio activity of the AV data. For example, in a televised news presentation anchored by two persons, there is often little activity in the video. A change of slide may be determined instead principally on the basis of a change in the speaker's voice, or where the speakers are in different locations. Yet another advantage of the invention is that it efficiently decides which frames (or key frames or Rframes) are to constitute visuals in a slide presentation so that they are not too closely spaced in time and a smooth slide presentation is produced. Still further, the invention synchronizes the audio and visual content and provides interactive rate controls for the visuals in the presentation.

Figure 1A:
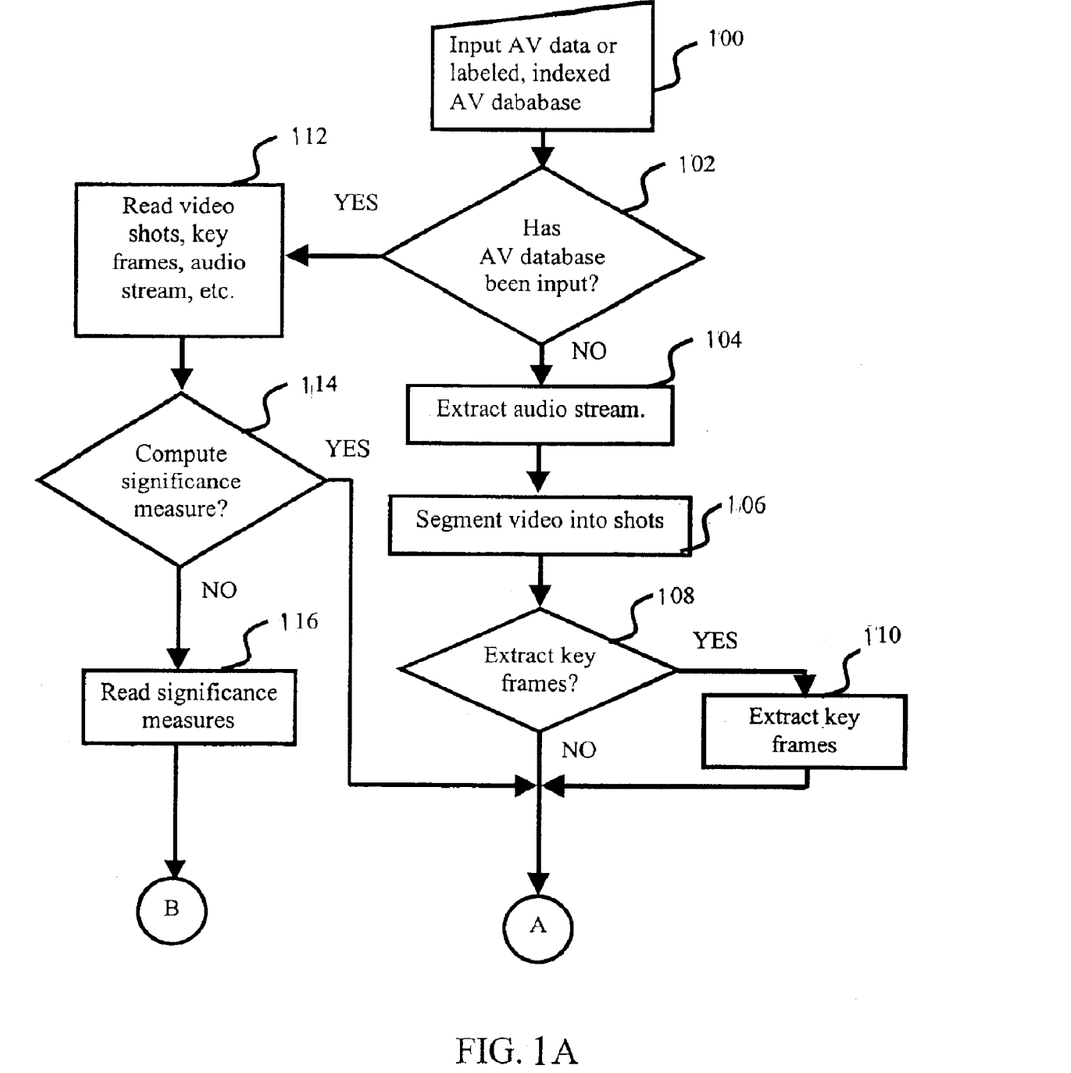
FIGS. 1A, 1B and 1C illustrate a flowchart of the method of converting full motion video into a multimedia presentation.
Figure 1B:
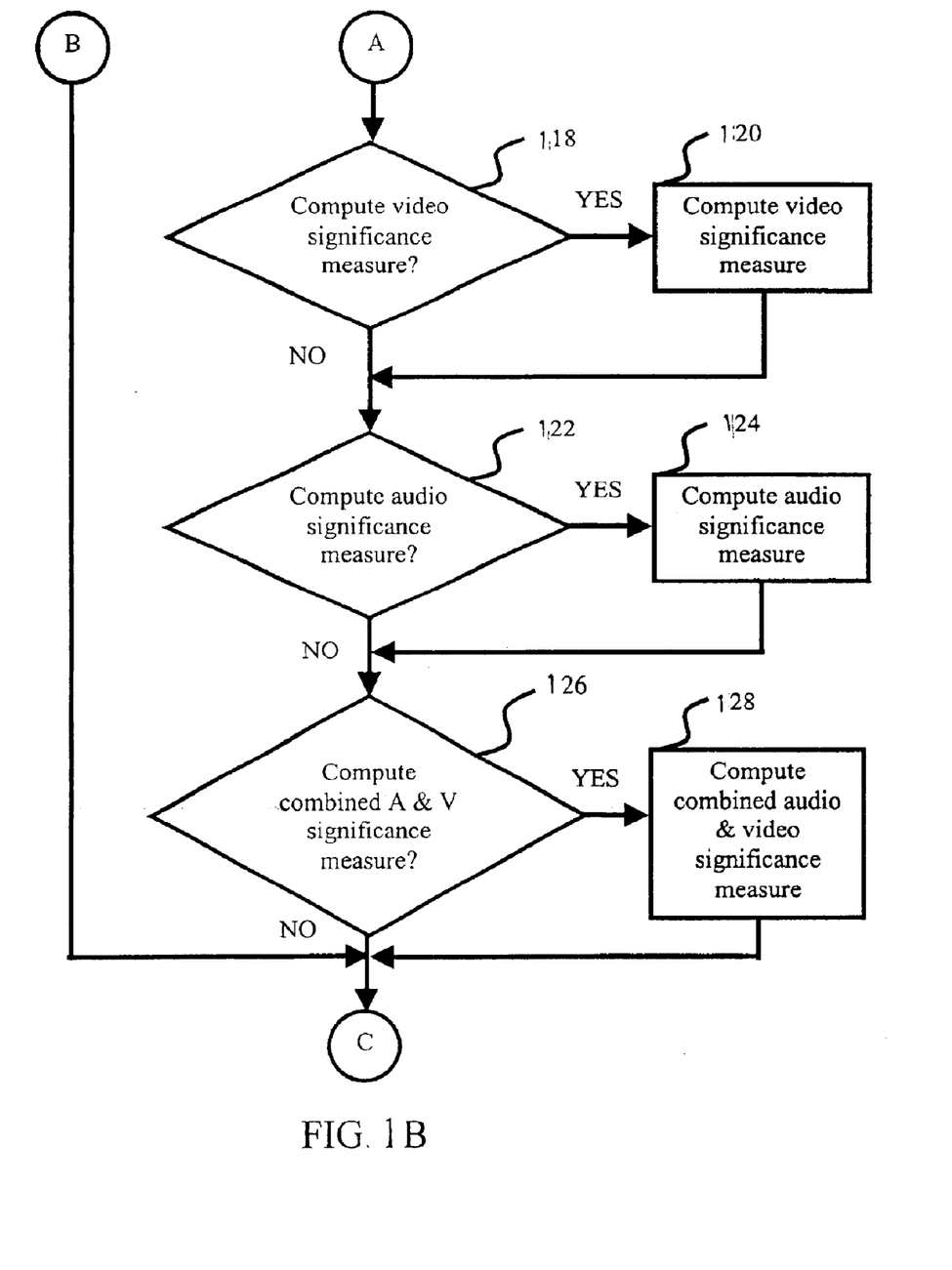
Figure 1C:
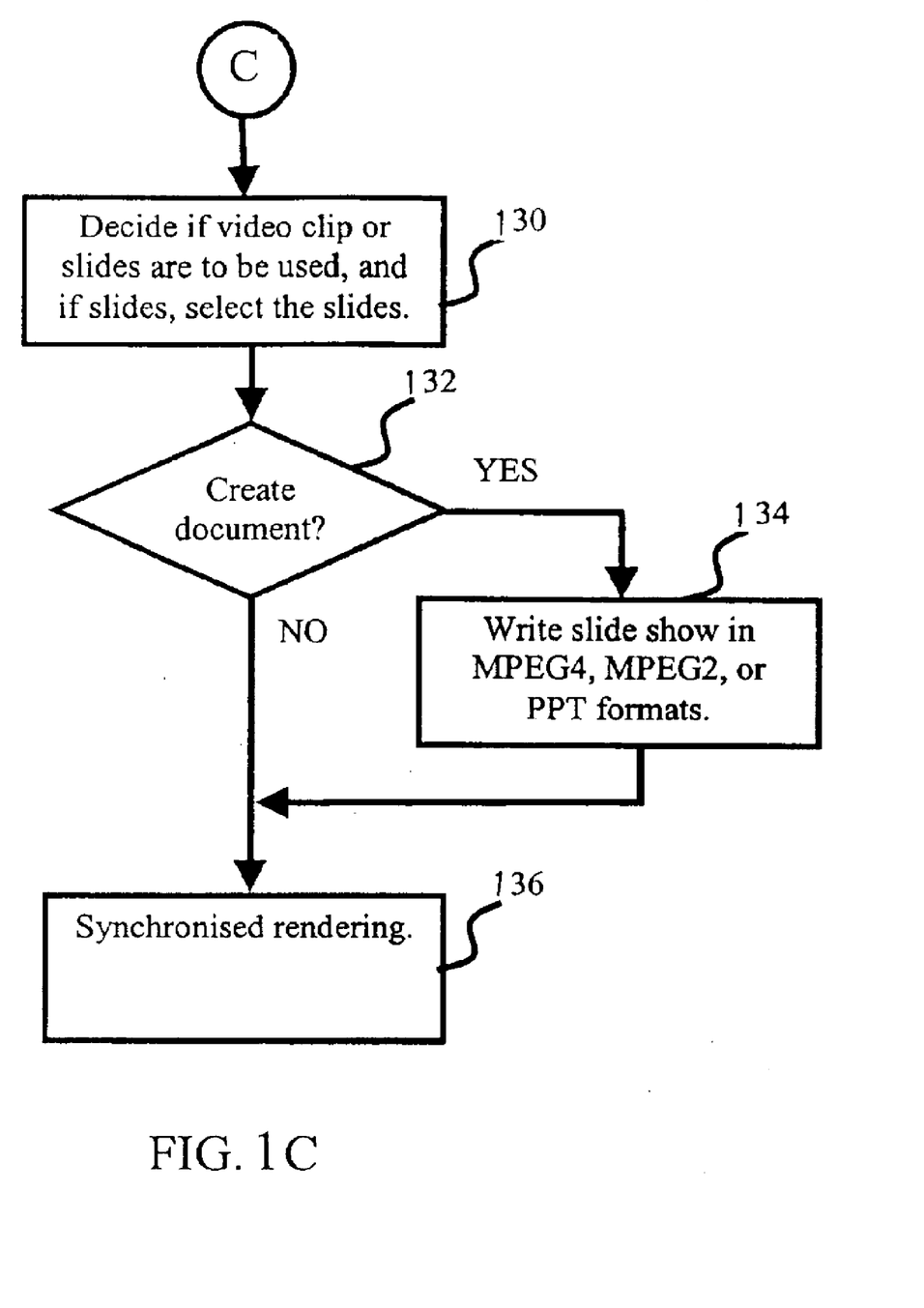

FIGS. 1A, 1B and 1C are flow diagrams illustrating the process of converting full motion video into a slide show document or presentation in accordance with an embodiment of the invention. Referring to FIG. 1A, in step 100, either AV data or a labeled, indexed AV database is input for processing. Techniques of labeling and indexing AV databases are well known to those skilled in the art. The system works with pre-segmented labeled video with associated indices, as well as linear video or AV data. In decision block 102, a check is made to determine if the input is an AV database. If decision block 102 returns false (NO), processing continues at step 104. In step 104, an audio stream is extracted from the "raw" AV data.

In step 106, the video stream or sequence is segmented into shots. This is done using video segmentation. Processing continues at decision block 108. In decision block 108, a check is made to determine if key frames (or Rframes) are to be extracted. If decision block 108 returns true (YES), processing continues at step 110. In step 110, key frames (or Rframes) are preferably extracted from the video segment. This is done using key frame extraction techniques. Processing then continues at step 118 of FIG. 1B. On the other hand, if decision block 108 returns false (NO), processing continues at step 118 of FIG. 1B.

Referring back to decision block 102 of FIG. 1A, if decision block 102 returns true (YES) indicating that an AV database has been input, processing continues at step 112. In step 112, components of the AV database are read, including video shots, key frames, an audio stream, etc. In decision block 114, a check is made to determine if the significance measure must be computed. If decision block 114 returns true (YES), processing continues at step 118 of FIG. 8B. Otherwise, if decision block 114 returns false (NO), processing continues at step 116. In step 116, the combined significance measures are read from the AV database. Again, these may include audio significance measures alone, video significance measures alone, or a combination of the two. Processing then continues at step 130 of FIG. 1C.

Referring to FIG. 1B, in decision block 118, a check is made to determine if the video significance measure must be computed. If decision block 118 returns true (YES), processing continues at step 120. In step 120, a video significance measure is computed for the video segment. The significance levels are computed based on the randomness of local motion in a given video segment. This measure reflects the level of action in the video segment. Video significance measures can be determined in accordance with the teaching of parent application Ser. No. 09/215,004, incorporated herein by cross-reference. Processing continues at decision block 122. Otherwise, if decision block 118 returns false (NO), i.e. it is not necessary or desired to do so, processing continues at decision block 122.

In decision block 122, a check is made to determine if the audio significance measure must be computed. If decision block 122 returns true (YES), processing continues at step 124. In step 124, an audio significance measure is computed or calculated. The significance levels are computed based on specified audio features, including the power, peak frequency and frequency-spread of audio signals in a given audio segment. This measure reflects the level of action or activity in the video segment. Preferably, this processing is applied to the entire audio stream and subsequently the audio significance measures for a given video segment are determined. However, this need not be the case, and alternatively a variation of the flow diagram may be employed where the audio significance measures are determined on a segment-by-segment basis.

In step 124, time-domain audio signals are preferably converted into the frequency domain using standard frequency transforms, such as the Fast Fourier Transforms (FFT), to determine relevant features indicating activity levels. However, it will be apparent to those skilled in the art in view of this disclosure that other transforms may be practiced without departing from the scope and spirit of the invention. Likewise, other techniques of determining features of the audio stream can be employed. Preferably, a short-time FFT is practiced to compute the features of power, peak-frequency and frequency spread of the audio signals. Other features may also be determined and used without departing from the scope and spirit of the invention. Power is the sum of the energy for all the frequency components in a short audio segment.

Figure 2:
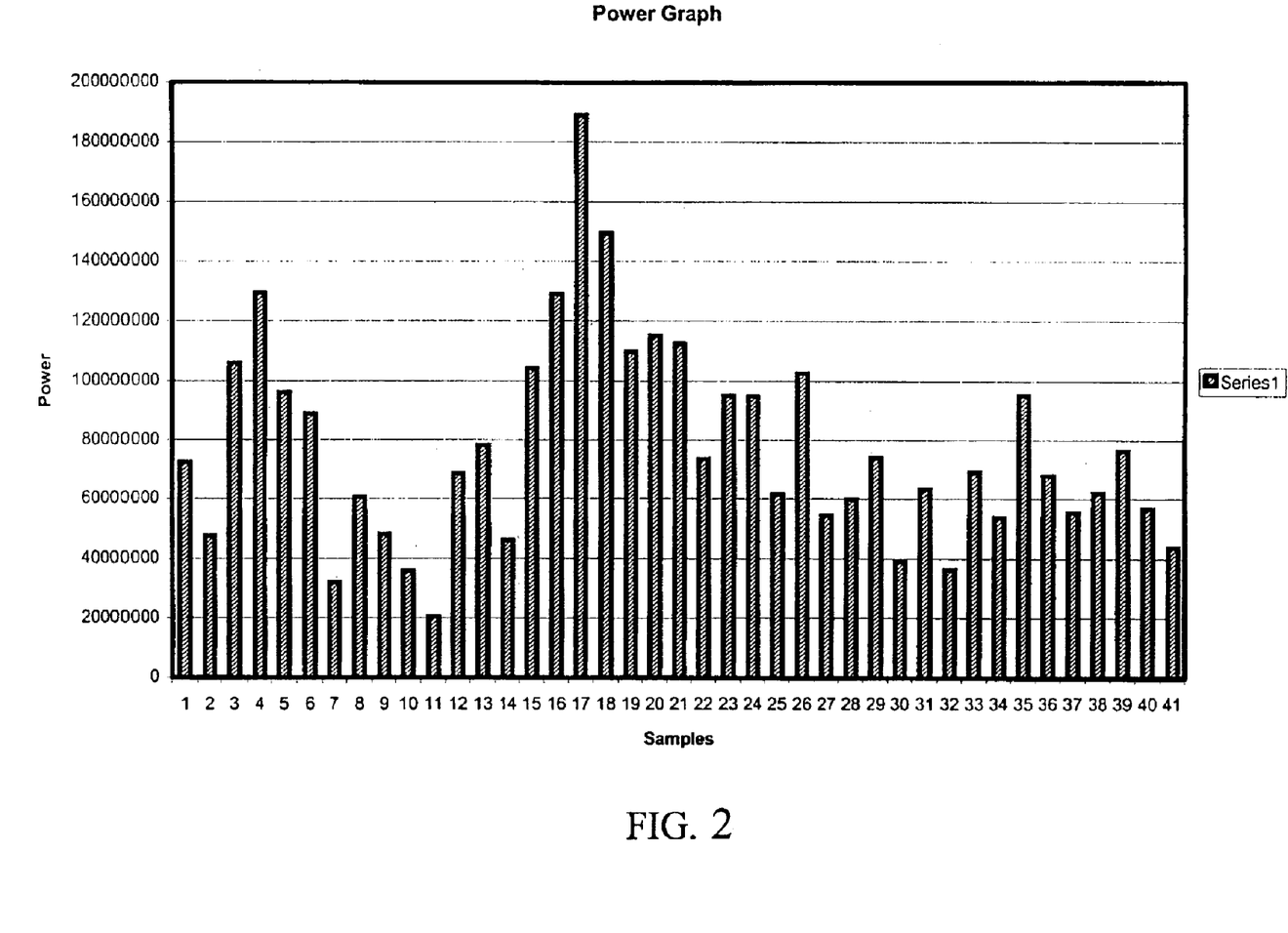
FIG. 2 is a graph depicting the power of an audio segment.
Figure 3:
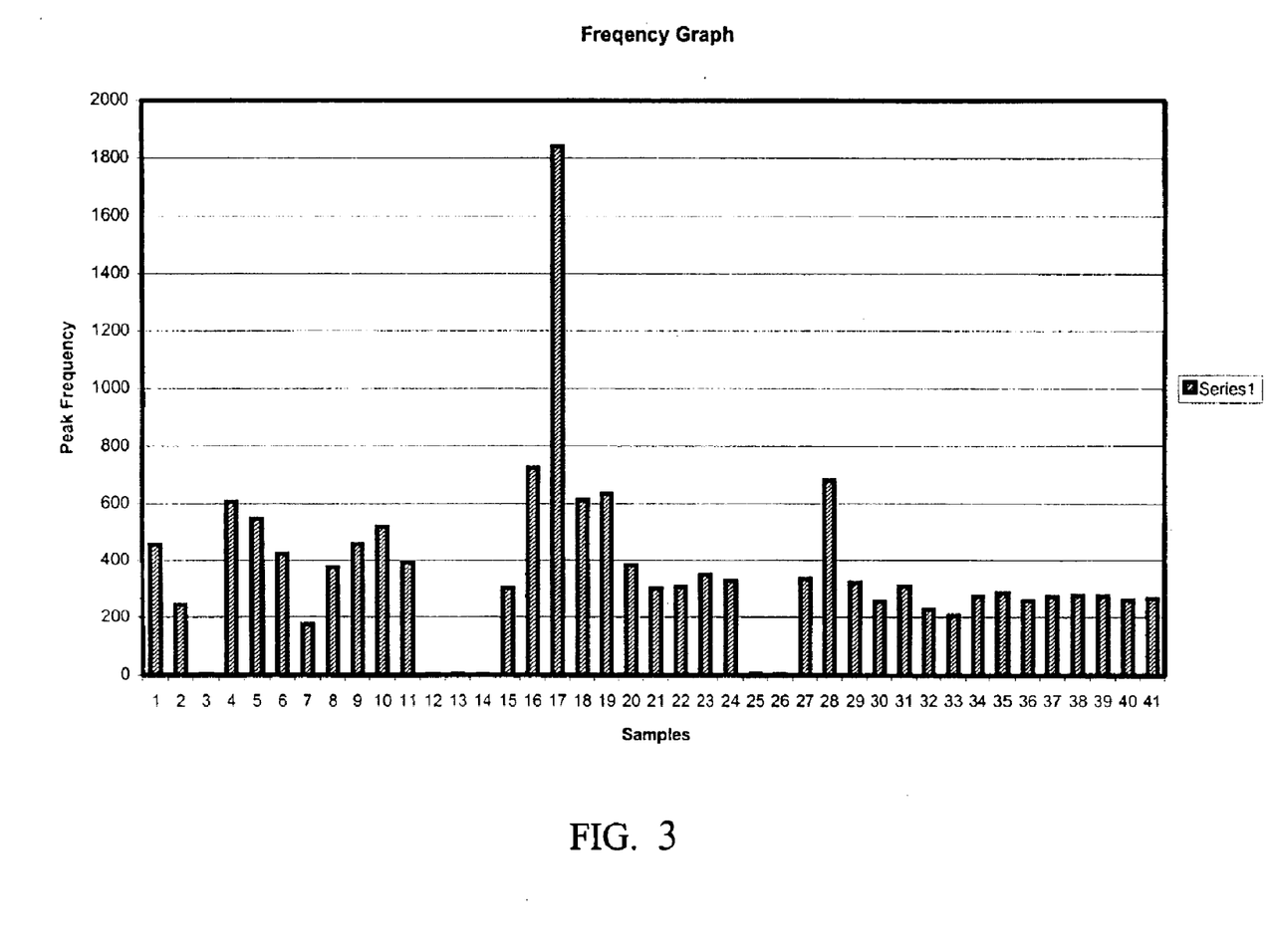
FIG. 3 is a graph of the peak frequency of the audio segment.
Figure 4:
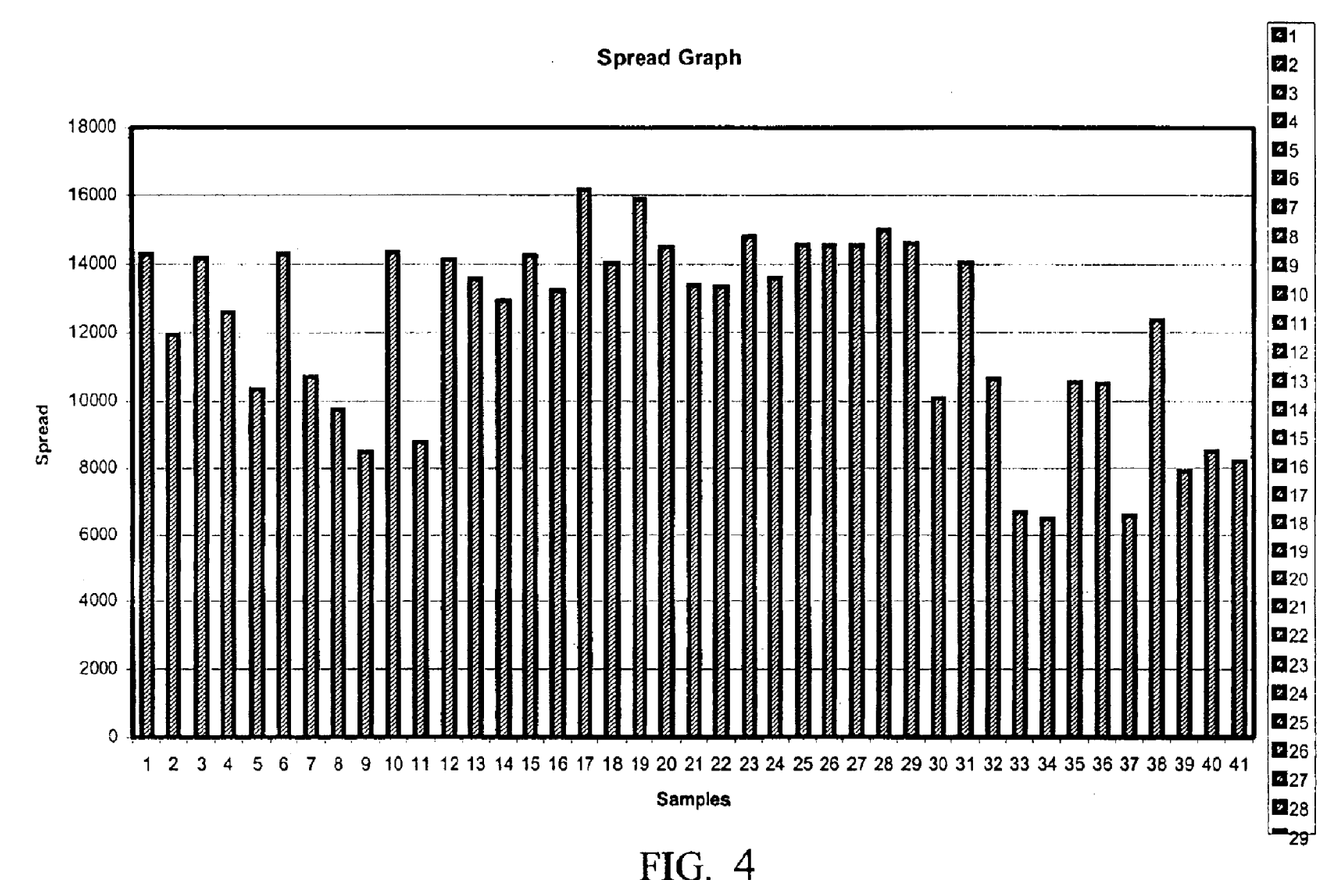
FIG. 4 is a graph of the spread of the audio segment.

FIG. 2 is a graph depicting the power of a typical audio segment. Peak frequency is the highest frequency in a short segment. FIG. 3 is a graph of the peak frequency for the same segment as that of FIG. 2. Spread or frequency spread is the difference between the highest and lowest frequencies that are above a threshold energy strength. FIG. 4 is a graph of the spread of the same segment of FIG. 2.

The audio significance measure is preferably calculated using these audio features according to different weights. A first (empirical) audio significance measure ("A") that can be practiced is: Power+PeakFrequency+Spread. Another (empirical) audio significance measure that can be practiced is: 2*Power+PeakFrequency+0.5*Spread. Each of the measures is computed on a set of samples. While certain significance calculations are specified, it will be apparent to those skilled in the art that other significance measures can be practiced without departing from the scope and spirit of the invention in view of this disclosure.

Figure 5:
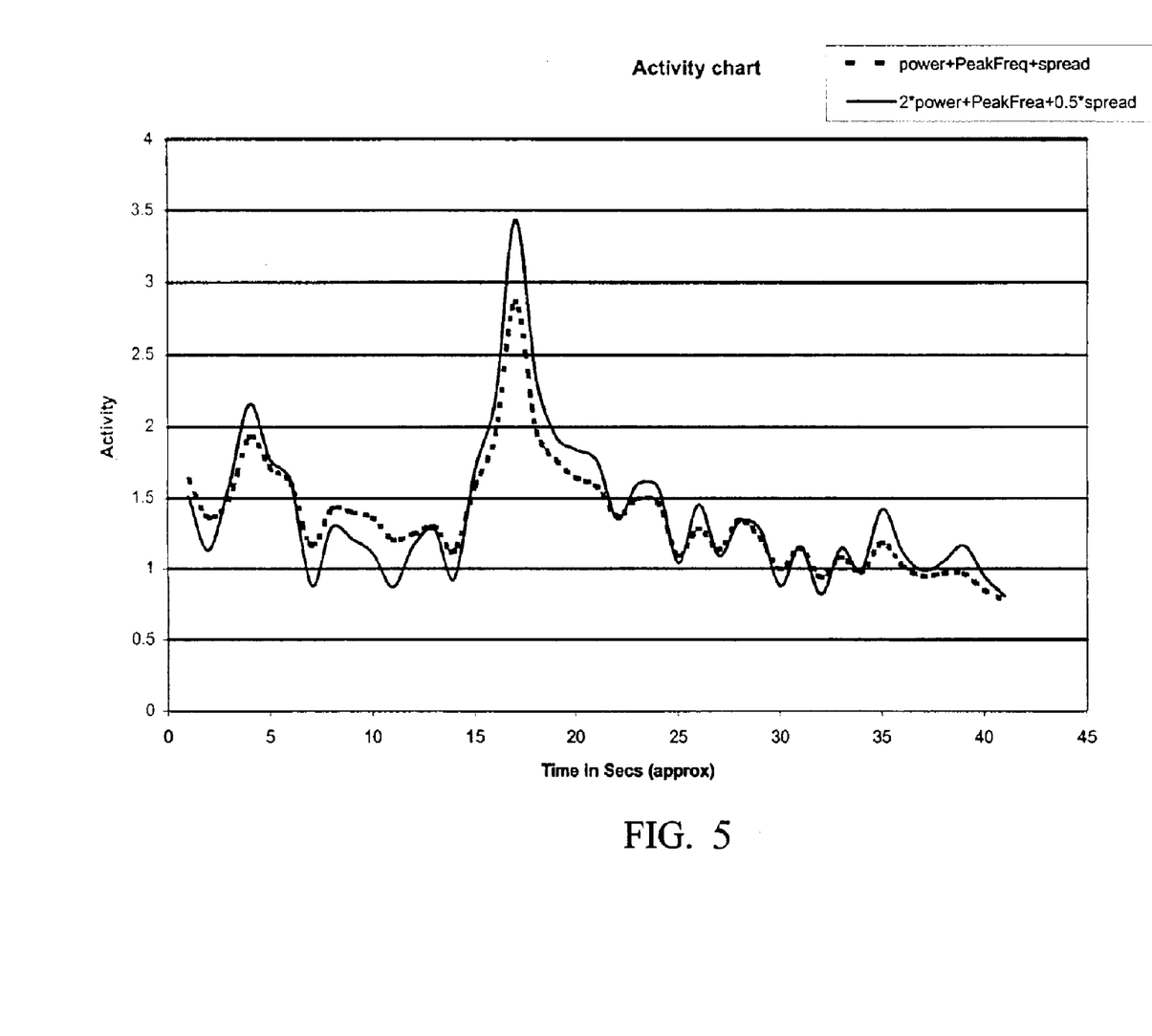
FIG. 5 is an audio activity graph for the audio segment.

FIG. 5 is a graph depicting calculated first and second activities (as defined above) as a function of time. The first activity measure is depicted with a solid line while a dashed line depicts the second one. Processing then continues at decision block 126. If decision block 122 returns false (NO), processing continues at decision block 126.

In decision block 126, a check is made to determine if the combined audio and video significance measure must be computed. If decision block 126 returns true (YES), processing continues at step 128. In step 128, the combined audio and video significance measures are computed. In particular, the relevant significance measure for determining if video should be used in the presentation, or slides (including the number and nature of slides) used, may be an audio significance measure alone, a video significance measure alone, or a combination of the two. This relevant significance measure is referred hereinafter to simply as the "combined significance measure". The audio and video significance measures can be combined in many ways. One way is as follows:

Let C=combined normalised significance measure,
Let A=normalised audio significance measure,
Let V=normalise video significance measure,
if (V>High_video_activity_threshold) C=V;
else if (A>High_audio_activity_threshold) C=A;
else if (V<Low_video_activity_threshold) C=A;
else if (A<Low_audio_activity_threshold) C=V;
else C=(A+V)/2.

User-supplied significance measures can be input in this step as well.

Processing then continues at step 130 of FIG. 1C. Otherwise, if decision block 126 returns false (NO), processing continues at step 130 of FIG. 1C.

Referring to FIG. 1C, in step 130, a determination is made whether to retain the video clip (shot) or to convert the shot into slides in the presentation based on either the audio significance measure ("A") alone or the combined significance measure ("C"). This requires the video clip to be assessed—typically in a frame-by-frame manner—to determine which thresholds come into play. The following rules can be applied:

if A>(High_audio_activity_threshold) then "retain video clip"
else if A<(High_audio_activity_threshold) then "convert into slides"

Consider here the example of a video clip of a soccer game. High crowd noise indicates action that is deserving of retaining the video clip.

Alternatively:
if C>(High_activity_threshold) then "retain video clip"
else if C<(High_activity_threshold) then "convert into slides"

Consider here the example of a news broadcast, where there may be high audio activity but low video activity, which is better suited to being rendered as slides.

Precisely which of the slides are to be used is based on the combined significance measure. Frames or key frames are selected from the shot. This includes determining the number of slides that are to be included in the presentation. This is dependent upon the AV information content signifying the importance of events in the video and can be based on the available transmission capacity as well. In this manner, temporal resolution of the slides in the presentation is decided. To perform both of these tasks, the process uses or computes the significance measures of both video and audio. To select slides, a logistic (s-shaped) distribution is preferably used. The logistic distribution is selected as the default as it represents several natural phenomena. However, any user-supplied distribution can also be used.

In decision block 132, a check is made to determine if a document is to be created. If decision block 132 returns false (NO), processing continues at step 136. Otherwise, if decision block 132 returns true (YES), processing continues at step 134. In step 134, the slide show is written in an appropriate format, including MPEG4, MPEG2 and PPT (PowerPoint™). That is, an MPEG-4 or MPEG2 stream can be created with equally spaced frames for the stills (the difference being the smallest difference between two adjacent slides). Alternatively, a PowerPoint™ presentation can be created based on a user's choice. Processing continues at step 136. In step 136, synchronous rendering of the presentation is performed. In particular, the slides are synchronized with the audio using an audio clock (timestamps). Resynchronization occurs when the user interacts with the presentation. A video clip is presented in the presentation at the point where the decision was made to display the video clip.

While transmitting a slideshow over a network, the audio stream may be transcoded to adapt it to the available bandwidth of the network. This transcoding may involve, amongst other things, changing the sampling frequency, changing the compression format, removal of silent segments, and the like. Further, in an analogous manner, images may be transcoded to adapt them for transmission over the network in view of the bandwidth of the network. Such transcoding may involve color reduction, conversion to black and white, quality reduction, size reduction, and the like.

Also, speaker discrimination may be used to select slides. The audio track can be analyzed. When a speaker stops speaker and another one starts can be detected. This can be used to select a frame close to the event as a slide, so that the change in speaker can be visually captured as well.

Optionally, the embodiments can be practiced using time compressed audio. This allows for a 5 minute audio stream to be stored using 2.5 minutes of storage, for example, without altering a speaker's voice significantly. This can be used to present a speeded up version of the slide show.

In the foregoing manner, a method, an apparatus and a computer program product for converting a full motion video into a document or presentation made up of video clips interspersed with stills have been disclosed. While only a small number of embodiments are described, it will be apparent to those skilled in the art in view of this disclosure that numerous changes and/or modifications can be made thereto without departing from the scope and spirit of the invention.

We claim:

1. A method for creating a multimedia presentation having video frames and video segments with synchronized audio, said method comprising the steps of:
   (g) receiving audio-video data;
   (h) separating said audio-video data into an audio stream and a video sequence;
   (i) dividing said video sequence into video segments, each of said video segments comprising a group of slide frames;
   (j) for each of said video segments;
      (d1) calculating an audio significance measure using said audio stream related to each of said video segments;
      (d2) using at least said audio significance measure, selecting either of each said video segments in its entirety or extracting at least one slide frame from said corresponding group of frames;
   (k) synchronizing said audio stream and selected video segments and said at least one slide frame; and
   (l) synchronously reproducing selected video segments and said at least one slide frame and said audio stream as said multimedia presentation.

2. The method according to claim 1, wherein, in step (d1), said audio significance measure is calculated from a measure of activity within said audio stream.

3. The method according to claim 2, wherein said measure of activity is determined from a frequency domain representation of said audio stream.

4. The method according to claim 2, wherein said measure of activity is calculated from one or more of power, peak-frequency and frequency spread.

5. The method according to claim 4, wherein said measure of activity is calculated as power+peak frequency+spread.

6. The method according to claim 4, wherein said measure of activity is calculated as 2×power+peak frequency+0.5×spread.

7. The method of claim 1, wherein, in step (d2), said selection is based upon a comparison of said audio significance measure with an activity threshold, such that if said threshold is exceeded, then said video segment is selected, else if not exceeded, said at least one slide frame is selected.

8. A method for creating a multimedia presentation having video frames and video segments with synchronized audio, said method comprising the steps of:
   (g) receiving audio-video data;
   (h) separating said audio-video data into an audio stream and a video sequence;
   (i) dividing said video sequence into video segments, each of said video segments comprising a group of slide frames;
   (j) for each of said video segments;
      (d1) extracting at least one representative frame from the corresponding said group of frames;
      (d2) calculating a video significance measure using the extracted at least one frame;
      (d3) calculating an audio significance measure using the audio stream related to said each of said video segment;
      (d4) using said video and audio significance measures, selecting either each of the video segments in its entirely or extracting at least one slide frame from said group of frames;
   (k) synchronizing said audio stream and the selected video segments and the extracted said at least one slide frame; and
   (l) synchronously reproducing the selected video segment and the extracted slide frame and said audio stream.

9. The method according to claim 8, wherein, in step (d1), said audio significance measure is calculated from a measure of activity within said audio stream.

10. The method according to claim 9, wherein said measure of activity is determined from a frequency domain representation of said audio stream.

11. The method according to claim 8, wherein said measure of activity is calculated from one or more of power, peak-frequency and frequency spread.

12. The method according to claim 11, wherein said measure of activity is calculated as power+peak frequency+spread.

13. The method according to claim 11, wherein said measure of activity is calculated as 2×power+peak frequency+0.5×spread.

14. The method according to claim 8, wherein said video significance measure is determined from a level of relative movement between said frames.

15. The method according to claim 14, wherein said frames comprise objects and said level of relative movement is determined from a direction and magnitude of motion ($u_i$, $v_i$) of each object in said frames to derive an activity value of the frame.

16. The method according to claim 15, wherein said activity value is determined from the standard deviation of the direction and magnitude ($u_i$, $v_i$) of each object.

17. The method of claim 16, wherein said activity value is determined according to the expression:

$$\text{Activity value} = = \sum_{i=1}^{i=k} \sqrt{[u_i - u]^2 + [v_i - v]^2}$$

wherein (u,v) is the average direction and magnitude of motion of all objects in said frame.

18. The method of claim 8, wherein, in step (d4), said selection is based upon a comparison of said audio significance measure with an activity threshold, such that if said threshold is exceeded, then said video segment is selected, else if not exceeded, said at least one slide frame is selected.

19. The method of claim 18, wherein said combined significance measure is equal to one of the audio significance measure, the video significance measure, or an average of said audio and video significance measures depending upon the level of audio and video activity.

20. Apparatus for creating a multimedia presentation having video frames and video segments with synchronized audio, said apparatus comprising:
  input means for receiving audio-video data;
  means for separating said audio-video data into an audio stream and a video sequence;
  means for dividing said video sequence into video segments, each of said video segments comprising a group of slide frames;
  processor means which, for each said video segments, calculates an audio significance measure using the audio stream related to each of the video segments, and, using at least said audio significance measure, selects either each of the video segments in its entity or extracts at least one slide frame from said corresponding group of frames;
  means for synchronizing said audio stream and selected video segments and extracted slide frames; and
  means for synchronously reproducing selected video segments and extracted slide frames and said audio stream as said multimedia presentation.

21. Apparatus for creating a multimedia presentation having video frames and video segments with synchronized audio, comprising:
  means for receiving audio-video data;
  means for separating said audio-video data into an audio stream and a video sequence;
  means for dividing said video sequence into video segments, each of said video segments comprising a group of slide frames;
  processor means which, for each of said video segments, extracts at least one representative frame from the corresponding group of frames, calculates a video significance measure using the extracted at least one frame, calculates an audio significance measure using the audio stream related to said each of said video segments, and, using said video and audio significance measures, selects either said each of said video segments in its entirely or extracts at least one slide frame from the group of frames;
  means for synchronizing said audio stream and selected video segments and extracted slide frames; and
  means for synchronously reproducing the selected video segments and the extracted slide frames and said audio stream.

22. A computer program product including a computer readable medium incorporating a computer program for creating a multimedia presentation having video frames and video segments with synchronized audio, said computer program having:
  input code means for receiving audio-video data;
  code means for separating said audio-video data into an audio stream and a video sequence;
  code means for dividing said video sequence into video segments, each of said video segments comprising a group of slide frames;
  processing code means which, for each of said video segments, calculates an audio significance measure using the audio stream related to said each of said video segments, and, using at least said audio significance measure, selects either said each of said video segments in its entity or extracts at least one slide frame from said corresponding group of frames;
  code means for synchronizing said audio stream and selected video segments and extracted slide frames; and
  code means for synchronously reproducing selected video segments and extracted slide frames and said audio stream as said multimedia presentation.

23. A computer program product including a computer readable medium incorporating a computer program for creating a multimedia presentation having video frames and video segments with synchronized audio, said computer program having:
  code means for receiving audio-video data;
  code means for separating said audio-video data into an audio stream and a video sequence;
  code means for dividing said video sequence into video segments, each of said video segments comprising a group of slide frames;
  processing code means which, for said each of said video segments, extracts at least one representative frame from the corresponding said group of frames, calculates a video significance measure using the at least one extracted frame, calculates an audio significance measure using the audio stream related to said each of said video segments, and, using said video and audio significance measures, selects either said each of said video segments in its entirety or extracts at least one slide frame from said group of frames;
  code means for synchronizing said audio stream and selected video segments and extracted slide frames; and
  code means for synchronously reproducing the selected video segments and extracted slide frames and said audio stream.

* * * * *